US 6,658,931 B1

(12) United States Patent
Plumb et al.

(10) Patent No.: US 6,658,931 B1
(45) Date of Patent: Dec. 9, 2003

(54) FLUID FLOW SENSING AND CONTROL METHOD AND APPARATUS

(75) Inventors: Daniel M. Plumb, Mississauga (CA); Benjamin E. Pettit, Toronto (CA); Michael J. Williams, Georgetown (CA)

(73) Assignee: Honeywell International Inc., Morristown, NJ (US)

( * ) Notice: Subject to any disclaimer, the term of this patent is extended or adjusted under 35 U.S.C. 154(b) by 91 days.

(21) Appl. No.: 09/611,739

(22) Filed: Jul. 7, 2000

Related U.S. Application Data

(60) Provisional application No. 60/188,868, filed on Mar. 13, 2000.

(51) Int. Cl.[7] ................................................ G01F 1/68
(52) U.S. Cl. ............................... 73/204.15; 73/204.16; 73/204.22
(58) Field of Search ................... 73/204.11, 204.13, 73/204.14, 204.15, 204.16, 204.17, 204.18, 204.19, 204.23, 204.24, 204.26, 204.27

(56) References Cited

U.S. PATENT DOCUMENTS

| 3,742,476 | A |   | 6/1973  | Withrow ............... 340/244 |
| 3,757,808 | A |   | 9/1973  | Peterson et al. .......... 137/2 |
| 3,803,913 | A | * | 4/1974  | Tracer ...................... 73/204 |
| 3,927,567 | A |   | 12/1975 | Novak ..................... 73/204 |
| RE31,906  | E | * | 6/1985  | Oyama et al. ....... 364/431.06 |
| 4,647,919 | A |   | 3/1987  | Wright ................... 340/608 |
| 5,311,762 | A | * | 5/1994  | Drexel |
| 5,339,687 | A |   | 8/1994  | Gimson ................ 73/204.19 |
| 5,533,412 | A | * | 7/1996  | Jerman et al. .......... 73/861.95 |
| 5,598,847 | A |   | 2/1997  | Renger ................... 128/691 |
| 6,032,526 | A | * | 3/2000  | Akamatsu ............ 73/204.17 |
| 6,314,807 | B1| * | 11/2001 | Kawai et al. .......... 73/204.26 |

FOREIGN PATENT DOCUMENTS

| AU |   | WO 89/01132  | * | 2/1989 | ............ G01F/1/68 |
| DE |   | 196 03 340 A1 |  | 8/1997 | ............ G01F/1/69 |
| WO |   | 89/01132 A   |   | 2/1989 | ............ G01F/1/68 |
| WO |   | 94/09344 A   |   | 4/1994 | ............ G01F/5/00 |

* cited by examiner

Primary Examiner—Edward Lefkowitz
Assistant Examiner—Corey D. Mack
(74) Attorney, Agent, or Firm—Larry J. Palguta

(57) ABSTRACT

A gas mass flow sensor or probe (35, 37, 39) of an air flow sensing and control system (17, 19, 21) based upon hot-wire type devices where flow sensing is achieved by controlling the difference between two temperature sensing elements (51 and 53) suspended in the flow stream (41, 43, 45). The first element (53) is used to measure the ambient temperature of the fluid flow and the second element (51) is maintained at a programmed temperature (121) above ambient by a current-fed heater (49). The mass flow rate density is determined from heater current (117) required to maintain the temperature difference and the total flow in the duct is inferred. To measure the flow in which the elements (51, 53) are submerged, electronic circuitry monitors the two temperature elements (51, 53) and controls the amount of current through the heater (49) such that there will always be a predetermined difference between the ambient and heated temperatures. The sensor provides an output signal (101) for use by other devices (23). The output in this case is a current signal proportional to the mass flow and scaled to the input range of a utilization device. The sensor circuit (103) shuts off power to the heater (49) to prevent overheating in the case of exposure to operating temperatures in excess of a predetermined maximum. These functions are all performed at a location which is closely adjacent to a duct (11, 13, 15) in which the fluid flows.

18 Claims, 6 Drawing Sheets

FLUID FLOW SENSING AND CONTROL METHOD AND APPARATUS

Priority is claimed upon U.S. provisional patent application No. 60/188,868 filed Mar. 13, 2000.

BACKGROUND OF THE INVENTION

1. Field of the Invention.

The present invention relates generally to fluid mass flow sensing devices, and more particularly to a fluid flow sensor which utilizes heat transfer to the fluid as a measure of flow. The sensor utilizes a hot-wire flow sensing technique and may be employed as part of an autonomous controller for regulating the fluid flow. Several such sensors may be deployed and operate essentially independent of one another in some applications.

2. Description of the Related Art.

Aircraft require the accurate measurement and control of airflow for performance and environmental functions such as engine starting, equipment cooling, and environmental control for cockpit and cabin compartments. These functions are typically managed by the aircraft bleed air control and environmental control system which is an integrated system of components that monitor the conditions and control the state of these and other functions throughout the aircraft. Traditional designs attempt to embed the electronic controls within a centralized hub controller and execute sensor readback/actuator drive output over lengthy wire bundles to respective sensors and actuators. The flow measurement in these functions is typically achieved through the use of mass flow sensors such as described by Novak et al. in U.S. Pat. No. 3,927,567. This patent discloses a hot-wire mass air flow meter for duct mounted purposes. The environmental system controller uses the output of the sensor as an input to control algorithms to perform system control functions.

It is desirable from both a cost and weight standpoint to eliminate the lengthy wire bundles and provide instead a sensor which is capable of performing stand-alone control functions autonomous of the overall system controller. To perform these autonomous control functions it is desirable for the sensor to have a current output scaled to the input of the controlled device. It is desirable to also provide a sensor that may be easily incorporated into existing fluid systems.

SUMMARY OF THE INVENTION

The present invention provides solutions to the above problems by consolidating sensor feedback, input /output signal filtering, and output actuator control into a single entity. All that is required for operation is power. Raw data (in this case, flow) is sensed at the duct and translated into an appropriate output signal which can be used as a control signal. The entity senses flow in a duct by monitoring the heater current required to maintain a programmed delta temperature relationship between a heated and an ambient element. The measured heater current (which is a nonlinear function of flow) is then translated into an output signal which is representative of airflow.

The invention comprises, in one form thereof, a flow sensor and controller assembly having a housing and a cantilevered flow sensing probe anchored to the housing at one end, and extending into the flow in good heat transfer relation therewith. There is an electrically heatable member within the probe and a first temperature sensitive resistance within the probe in close proximity to the heatable member. A second temperature sensitive resistance is located within the probe remote from the electrically heatable member so as to be thermally isolated therefrom. Electrical circuitry within the housing supplies substantially constant current to each of the temperature sensitive resistances and amplifies the signals for processing. These amplified signals are then processed along with a delta temperature set point signal to provide an input to the heater current drive circuitry, which generates the current to power the heated member. The heater current used to perform this function is then measured and processed to provide control signals related to the flow rate, or to influence the flow rate, or to affect characteristics of the fluid flow.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
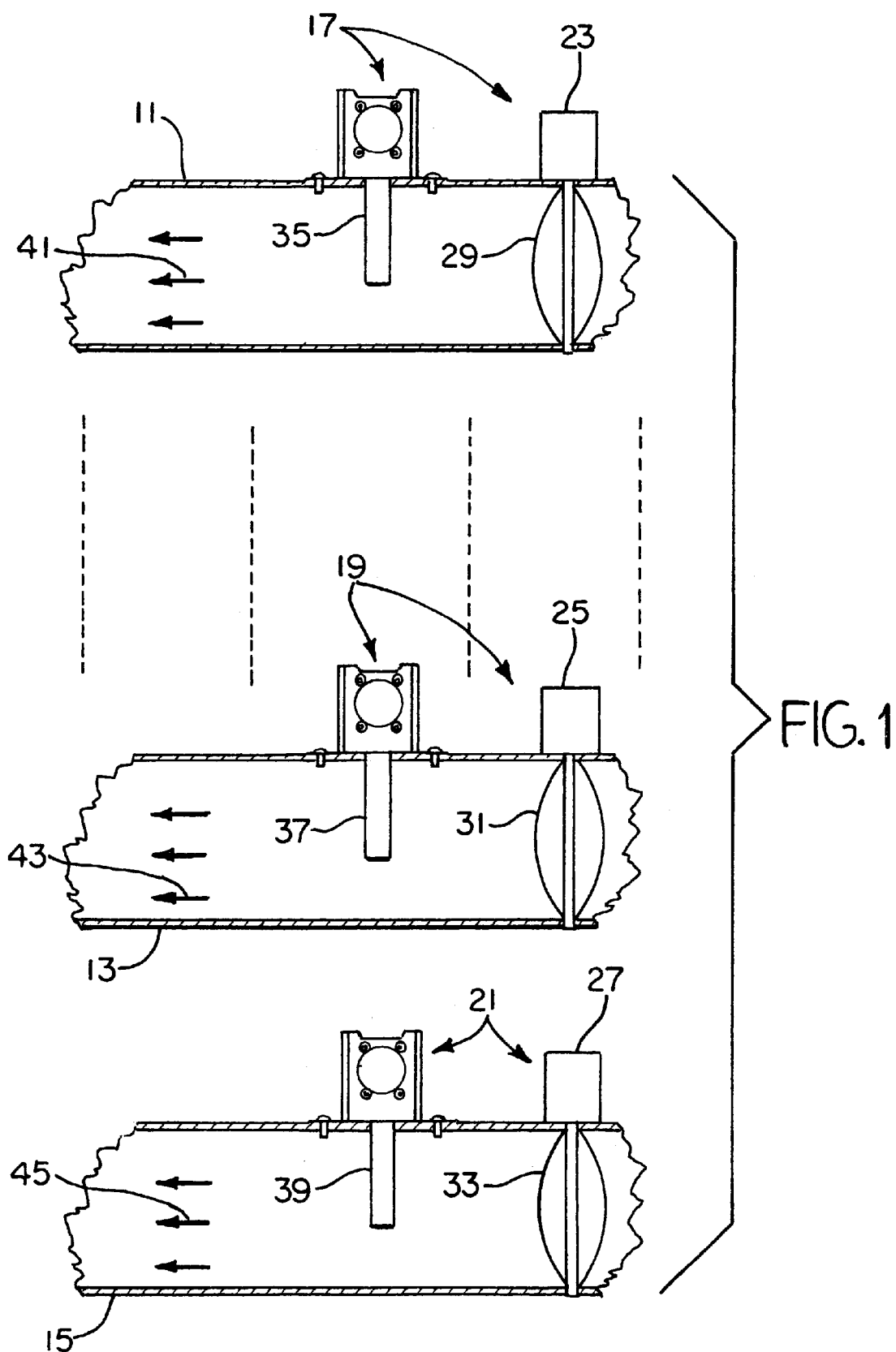
FIG. 1 is a view, partially in cross-section, of a plurality of air flow ducts each having a sensor and control assembly according to the present invention in one form.

Referring now to the drawings and particularly to FIG. 1, there is shown a plurality of air passageways or conduits 11, 13, and 15, for example, as found at various different locations in an aircraft. There may be more than three such conduits as illustrated by the vertical dotted lines. There is also illustrated a plurality of autonomous air flow sensing and control systems 17, 19 and 21, each of which is closely adjacent to an associated specific air flow conduit 11, 13 or 15 for controlling the air flow rate within the associated conduit. The air flow is illustrated by the arrows 41, 43 and 45. Each sensing and control unit comprises a housing fixed to the conduit and a probe 35, 37 or 39 extending from the housing into the conduit for monitoring the air flow through the conduit. An illustrative sensing and control unit is illustrated in detail in FIGS. 2–5 There are also flow controllers 23, 25 and 27 located near the unit housing each of which is responsive to control signals indicative of the air flow sensed by the corresponding sensing probe for controlling the air flow through the associated conduit. The controllers 23, 25 and 27 are illustrated as operating associated butterfly valves 29, 31 and 33, however, a wide variety of forms or devices are possible. Flow indicative signals may be supplied to a central location such as an aircraft cockpit, however, the individual conduit sensing and control units may operate independent of one another to regulate the air flow through their associated conduit.

Figure 2:
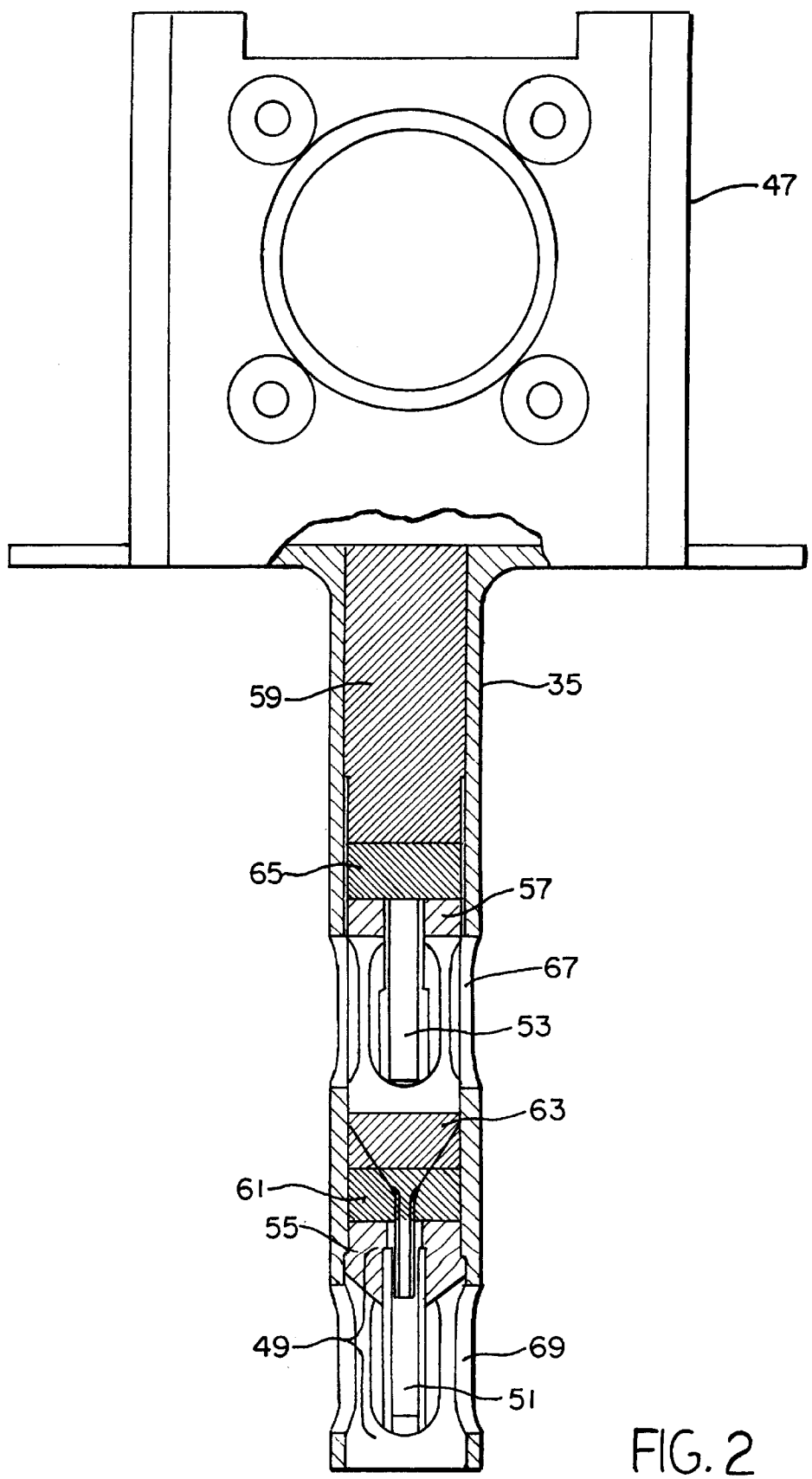
FIG. 2 is an end view, partially in cross-section, of an exemplary sensor and control unit of FIG. 1.
Figure 3:
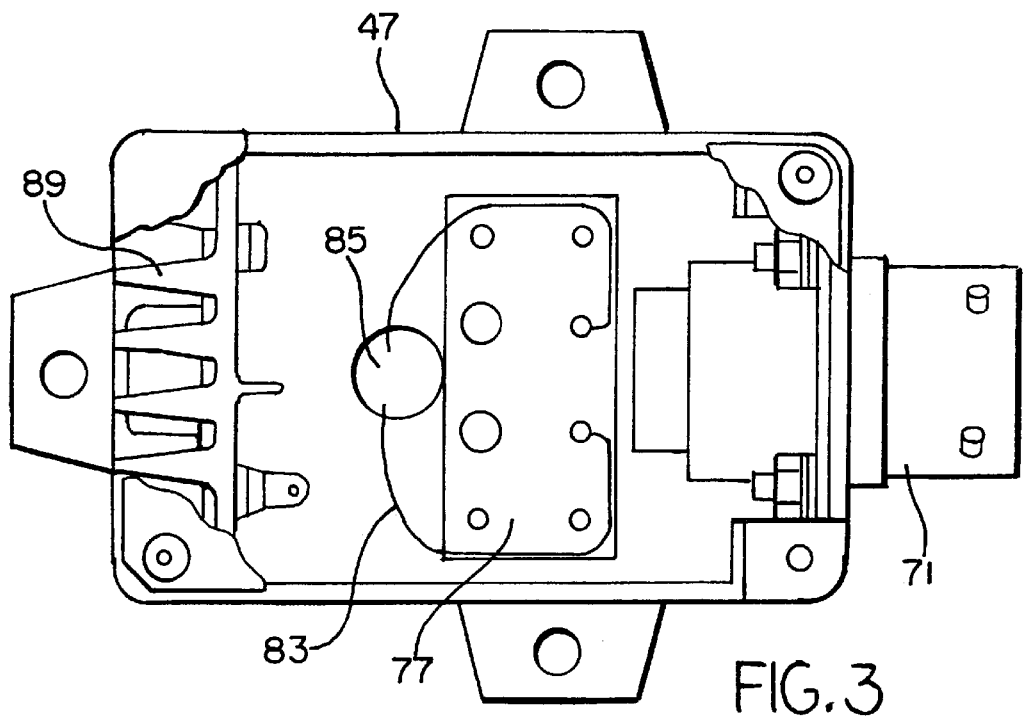
FIG. 3 is a partially cut away top view of the unit of FIG. 2.

Comparing FIGS. 1 and 2, the air flow sensor and control assembly includes a housing 47 with the cantilevered flow sensing probe 35 anchored to the housing 47 at one end, and extending into the air flow in good heat transfer relation therewith. The probe 35 includes an electrically heatable member 49 and a platinum temperature sensitive resistance or sensor 51 within the probe and in close proximity to the heatable member 49. There is also a second platinum temperature sensitive resistance or sensor 53 within the probe which is located somewhat remote from, and thermally insulated from, the electrically heatable member 49. Probe 35 comprises a tubular member with air passing apertures such as 67 and 69. These apertures allow free air flow past the sensor 53 and the heater/sensor combination 49, 51 respectively. Mounting slugs 55 and 57 and potting or sealant materials such as at 59, 61, 63 and 65 fill certain regions of the probe tube.

Figure 4:
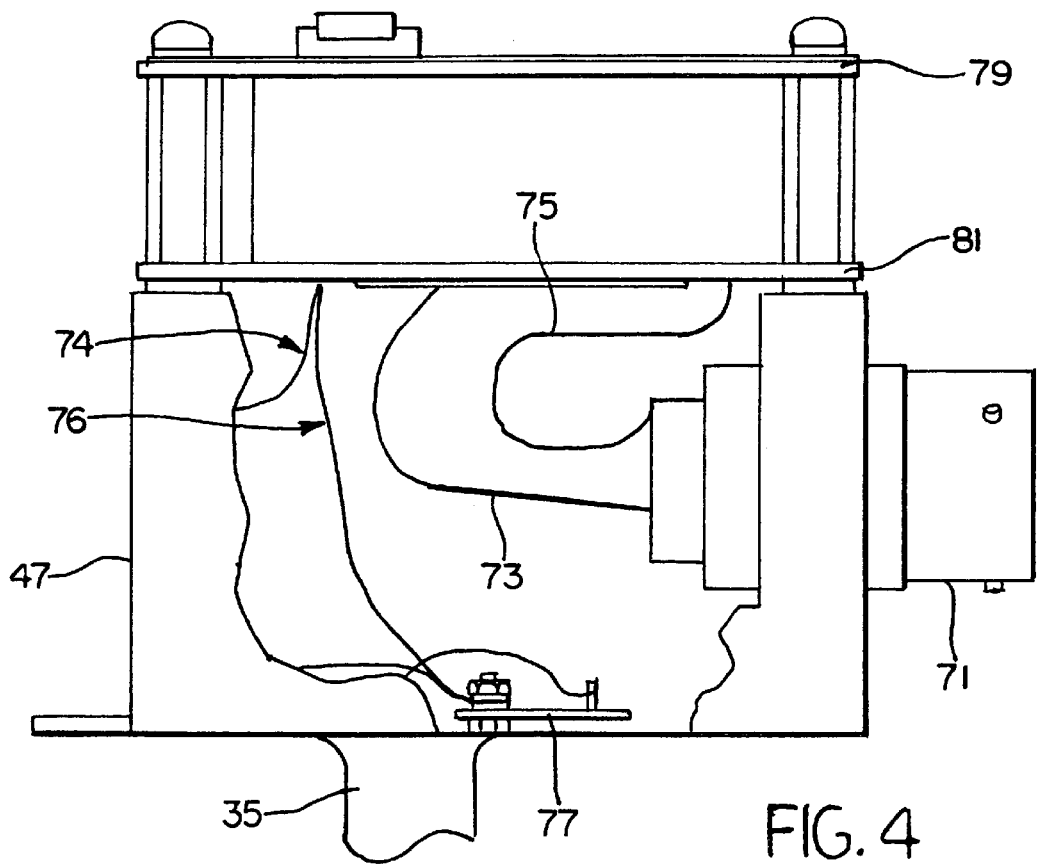
FIG. 4 is a partially cut away side view of the unit of FIGS. 2 and 3.

FIGS. 2 and 4 show the cantilevered flow sensing probe 35 anchored to the housing 47 at one end. The housing also includes a sensor connector 71 coupled by way of interconnecting wires such as 73 and 75 that are operatively coupled to sensor circuit boards 79 and 81. Leads such as 83 originate from the termination circuit board 77 through an opening 85 in the housing 47 and into the probe 35. A power transistor 87 (FIG. 5) is mounted to the housing sidewall near the cooling fins 89. Termination circuit board 77 and power transistor 87 are interconnected to circuit boards 79 and 81 by leads 74 and 76.

Figure 5:
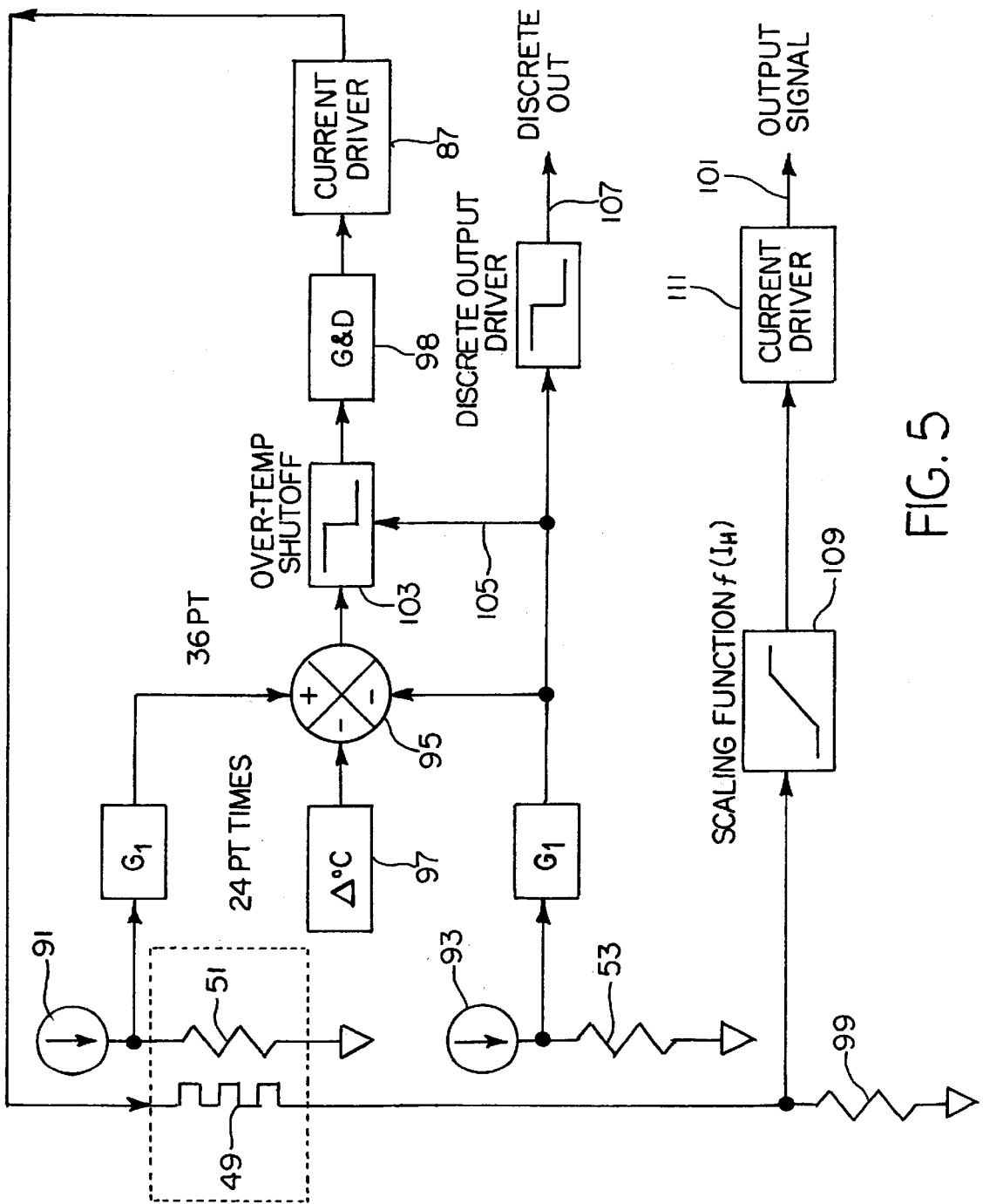
FIG. 5 is an electrical diagram of the sensor electrical functions housed within the unit of FIGS. 2–4.

In FIG. 5, two Howland current pumps 91 and 93 made with high precision operational amplifiers source constant currents through each of the two platinum temperature elements (temperature sensitive resistances) 51 and 53. The voltage across the resistors 51 and 53 will increase with increased platinum element resistance and, after a voltage gain of $G_1$, an indication of each temperature is supplied to the summer 95. A fixed temperature increment $\Delta$ is also supplied to the summer as indicated at 97. The temperature increment is fixed for this application; however, other applications may utilize variable or programmed $\Delta T$ controls. An error signal is produced from the two temperature signals of $$Th—Ta—\Delta=Error$$

Where Th is the heated element temperature in degrees C and Ta is the unheated element temperature in degrees C. Thus, when the heated element is at the predetermined increment $\Delta$ from the ambient temperature, there will be 0 error. A positive error means that the heated element is greater than the temperature delta setpoint, and a negative error signal indicates that the heated element is less than the indicated increment above the ambient temperature. The output from the summer 95 is used to set the rate of change of current to the heater 49 in the gain and dynamics circuit 98. A dynamic operational ampliifer circuit is used to control this rate of change and the resulting heater current through an NPN transistor in the current driver 87. This compensation can be tuned by component changes in order to control the rate of change such that the closed loop control of the heater current is optimized for this application. Another series of operational amplifiers senses the heater current through a sense resistor 99 and converts that into a scaled current output on line 101.

To prevent overheating of the heater 49 and heated element or sensor 51, over-temperature cutoff circuitry 103 prevents any current from flowing through the heater 49 when the ambient temperature indication supplied on line 105 increases above a critical setpoint. This circuitry includes a comparator which monitors the ambient temperature, and will control the error signal such that no current is supplied to the heater in the over temperature condition. This comparator also forces the output current to its maximum value based on an internal voltage clamp circuit. For other applications, the circuit can be configured so the comparator can force the output current to other values. An open/short discrete output on line 107 indicates whether or not the sensor is in an over temperature condition. The signal on line 101 mau be supplied to a flow controller such as 23 to influence the flow rate through the conduit. The signals on lines 101 and 107 may, if desired, be supplied to a location remote from the sensor and control assembly such as an aircraft cockpit.

In summary, the circuitry of FIG. 5 has the temperature sensitive resistance 51 within the probe 35 and in close proximity to the heatable member 49. The temperature sensitive resistance 53 is also located within the probe 35, but positioned somewhat remote (thermally isolated) from the electrically heatable member 49. The electrical circuitry supplies substantially constant current to each temperature sensitive resistance 51 and 53 and amplifies the signals for processing. The amplified signals are processed along with a delta temperature set point signal at summer 95 to provide an input to the heater current drive 87 which generates the current to power the heatable member 49. The circuitry also includes scaling function 109 and output signal current driver 111 which respond to the voltage drop across resistor 99 to control the fluid flow rate in the conduit. To maintain the difference between the temperatures of the two resistances 51 and 53 substantially constant or to a programmed differential, an output control signal from the sensor can be used to vary the flow rate. Variation of the elements of the output signal current driver 111 according to the desired application will permit the sensor to provide either control signals related to the flow rate, or to influence or modulate the flow rate, or affect characteristics (for example, temperature) of the flow.

Figure 6:
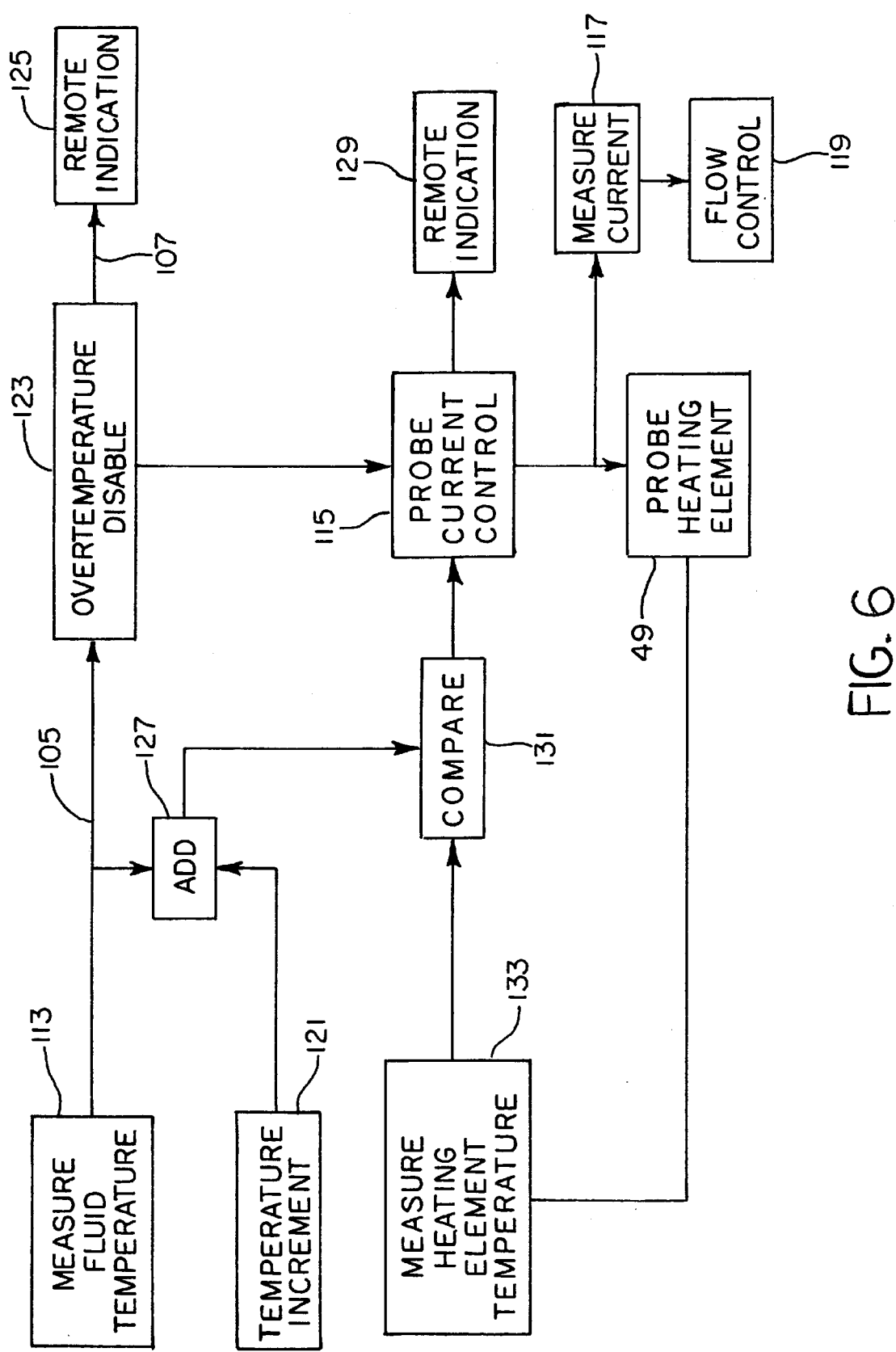
FIG. 6 is a functional block diagram illustrating the operation of the unit of FIGS. 2–4.

The operation of the circuitry is summarized in FIG. 6 where the ambient measured fluid temperature 113 is added at 127 to the offset temperature increment 121 ($\Delta^\circ$ C. from 97 of FIG. 5). The sum is then compared at 131 with the measured heating element temperature 133, and the comparison utilized to control the probe heating element current 115. The addition is performed in FIG. 5 by the two negative inputs to the summer 95, while the comparison results from the summer 95 combining those two negative inputs with the single positive input. The probe heater current control 115 utilizes the comparison to vary the current to the heater 49. The heating element current is measured at 117 and that measure utilized to control the fluid flow as at 119. The current measure and control is provided by the resistor 99, scaling function 109 and output signal current driver 111 in FIG. 5. If an excessive ambient fluid temperature is detected at 123, the probe current control 115 is disabled and a remote indication 125 provided. In the exemplary aircraft environment, this remote location would typically be the cockpit. An indication of the mass flow rate of the fluid within the conduit may also be supplied to a remote utilization device such as an indicator in an aircraft cockpit if desired.

Materials were selected so that the sensor may be operated at gas temperatures up to 121° C. (250° F.). Materials selection included a combination of adhesives, sealing materials and potting compounds that fully encapsulate the sensor elements and environmentally seal them within the sensor probe 35. Materials selection also extends to the choice of sensing element, where platinum resistance temperature detectors or sensors 51 and 53 are used. The platinum element is operational up to 850° C. (I 562° F.), much higher than the thermistors typically used in hot wire sensors. The invention is preferably practiced by placing the platinum resistance elements along the same axis, within the probe 35. Ideally, it is best suited to mount the sensor externally on the top side of the duct, with only the probe 35 exposed to the air mass flow within the duct as shown in FIG. 1.

Figure 7:
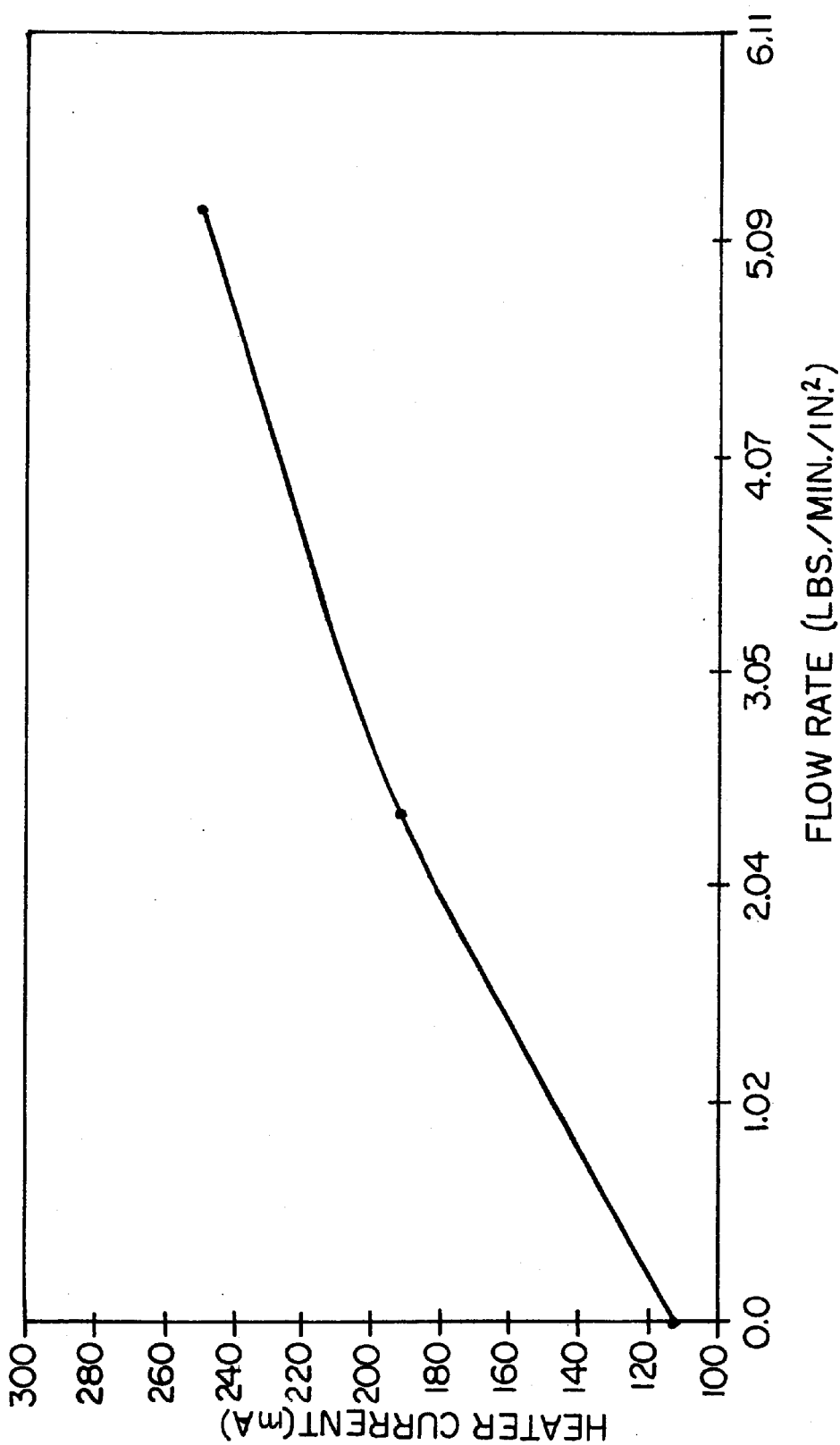
FIG. 7 is a graph showing a sample relationship between the heater current and fluid flow rate.

A sample characteristic output curve of the flow sensor is shown in FIG. 7. The actual flow vs output signal characteristic equation must be determined through testing for each installation. The slight nonlinearity of the heater current verses the flow rate is visible in FIG. 7. Due to the highly linear resistance versus temperature characteristic of the component temperature sensitive resistances 51 and 53, the flow sensor is capable of measuring flow over a broader range of operating temperatures than provided by comparable thermistor based sensors. The platinum elements also facilitate the delta temperature control function over a broader operating temperature range. FIG. 7 is based upon data collected from a five inch airflow duct installation. The flow density (lbs/min/in$^2$) reference is employed to allow installation in various duct sizes, within reasonable limits. The scaled output depicted in FIG. 7 is applicable to a specific aircraft installation. Variation of this design can accommodate alternate voltage (0–10V) or current (4–20 mA) configurations. This sensor can be used in ducts, HVAC, heavy industrial air conditioning systems, and other similar systems. The output of the sensor can be used to drive meters directly or can be used in a controller of a larger system. In the case of a five inch duct, flow varying between 0 and 200 lb/min is mapped to an output between 0 and 1 ma. For specific applications which include significant variations in media temperatures or duct sizes, etc., the output of the sensor must be characterized for each application.

What is claimed is:

1. A plurality of autonomous fluid flow sensor and controller assemblies which share a common power source and provide flow indicative signals to a common remote location, each flow sensor and control assembly otherwise autonomously operable independent of the other flow sensor and control assemblies and comprising:
   a housing;
   a cantilevered flow sensing probe connected to the housing at one end and extending into a flow in good heat transfer relation therewith;
   an electrically heatable member within the probe;
   a first temperature sensitive resistor within the probe and in close proximity to the heatable member and solely thermally contacting the heatable member;
   a second temperature sensitive resistor within the probe and remote from the electrically heatable member and thermally isolated from the heatable member; and
   electrical circuitry within the housing receiving power from the common power source for supplying a substantially constant currents to each of the temperature sensitive resistors and a variable current to the heatable member, the electrical circuitry including means responsive to a voltage drop across the first temperature sensitive resistor for controlling the variable current and means responsive to the variable current for providing control signals to influence the fluid flow rate.

2. The fluid flow sensor and controller of claim 1, wherein the difference between the temperatures of the first and second temperature sensitive resistors are maintained substantially constant in order to operatively vary the fluid flow rate.

3. The fluid flow sensor and controller of claim 1, wherein electrical circuitry includes means for controlling the rate of change and including the value of electrical current supplied to the heatable member.

4. The fluid flow sensor and controller of claim 1, wherein the first and second temperature sensitive resistors are platinum temperature sensitive resistors having substantially linear resistance vs. temperature characteristics.

5. The fluid flow sensor and controller according to claim 1, wherein the probe is in direct physical contact with the bottom of the housing.

6. The fluid flow sensor and controller according to claim 5, wherein the probe has a longitudinal plane which is perpendicular to the bottom of the housing.

7. The fluid flow sensor and controller according to claim 6, wherein an outer surface of the probe along the horizontal plane has a plurality of apertures for allowing free air flow to pass.

8. An aircraft having a plurality of autonomous air flow sensing and control units each operable independent of the others and associated with a specific air flow conduit for controlling the air flow rate with the associated conduit, each unit comprising:
   a housing fixed to the conduit;
   a sensing probe extending from the housing into the conduit for monitoring the air flow through the conduit having an electrically heatable member in good heat transfer relation with the associated air flow, a first temperature sensitive resistor within the probe solely thermally contacting in good heat transfer relation with the heatable member, and a second temperature sensitive resistor within the probe remote from and thermally isolated from the electrically heatable member and in good heat transfer relation with the associated air flow; and
   a flow controller located closely adjacent the housing and responsive to the air flow sensed by the sending probe for controlling the air flow through the conduit.

9. The combination of claim 8, wherein each housing includes electrical circuitry for supplying substantially constant currents to each of the associated temperature sensitive resistors and a variable current to the heatable member, the electrical circuitry including means responsive to the voltage drop across the first temperature sensitive resistor for controlling the variable current, and means responsive to the variable current for providing control signals to the associated flow controller.

10. The combination of claim 8, wherein the electrical circuitry receives power from a common source and includes means for controlling the rate of change of electrical current supplied to the heatable member.

11. A proves of sensing and controlling flow of a fluid through a conduit, comprising the steps of:
   providing a probe containing a first temperature sensitive resistor and a second temperature resistor within the probe;
   providing a measure of the temperature of the fluid passing through the conduit;
   exposing an electrically heatable element to the flow of fluid, the electrically heatable element being within the probe;
   providing the first temperature sensor resistor in close proximity to the electrically heatable element, and solely thermal contacting the heatable element;
   providing the second temperature sensitive resistor remote from the electrically heatable element and thermally insulated from the electrically heatable element;
   supplying an electrical current to the element to maintain the temperature of the element at a determined temperature by exposing another resistor having substantially linear resistance vs. temperature characteristics to the element, measuring the resistance of the exposed another resistor, and utilizing the measure of the temperature of the fluid passing through the conduit and the measured resistance to vary the electrical current supplied to the element;

measuring the current supplied to the element;

utilizing the measure of current to provide a control signal utilizing the control signal to control the rate of fluid flow; and performing all the foregoing steps at a location closely adjacent the conduit.

12. The process of claim 11, wherein the determined temperature is a predetermined increment above the measured temperature of the fluid.

13. The process of claim 11, including the additional step of disabling the flow of current to the element if the measure of the fluid temperature exceeds a predetermined maximum.

14. The process of claim 13, wherein the predetermined maximum is about 250° F.

15. The process of claim 13, including the further step of providing an indication that the predetermined maximum temperature has been exceeded and the current disabled to a location remote from the conduit.

16. The process of claim 11, including the additional step of providing the control signal indicative of the mass flow rate of the fluid within the conduit to a utilization device remote from the conduit.

17. The process of claim 11, wherein the step of measuring the resistance of the exposed resistor is performed by supplying a substantially constant current flow through the resistor, and measuring the voltage drop across the resistor.

18. The process of claim 11, wherein the step of supplying electrical current to the heatable element includes the step of controlling the rate of change of electrical current supplied to the heatable element.

* * * * *